May 8, 1951 T. IAVELLI 2,551,746
HYDRODYNAMIC TRANSMISSION
Filed May 8, 1948 2 Sheets-Sheet 1
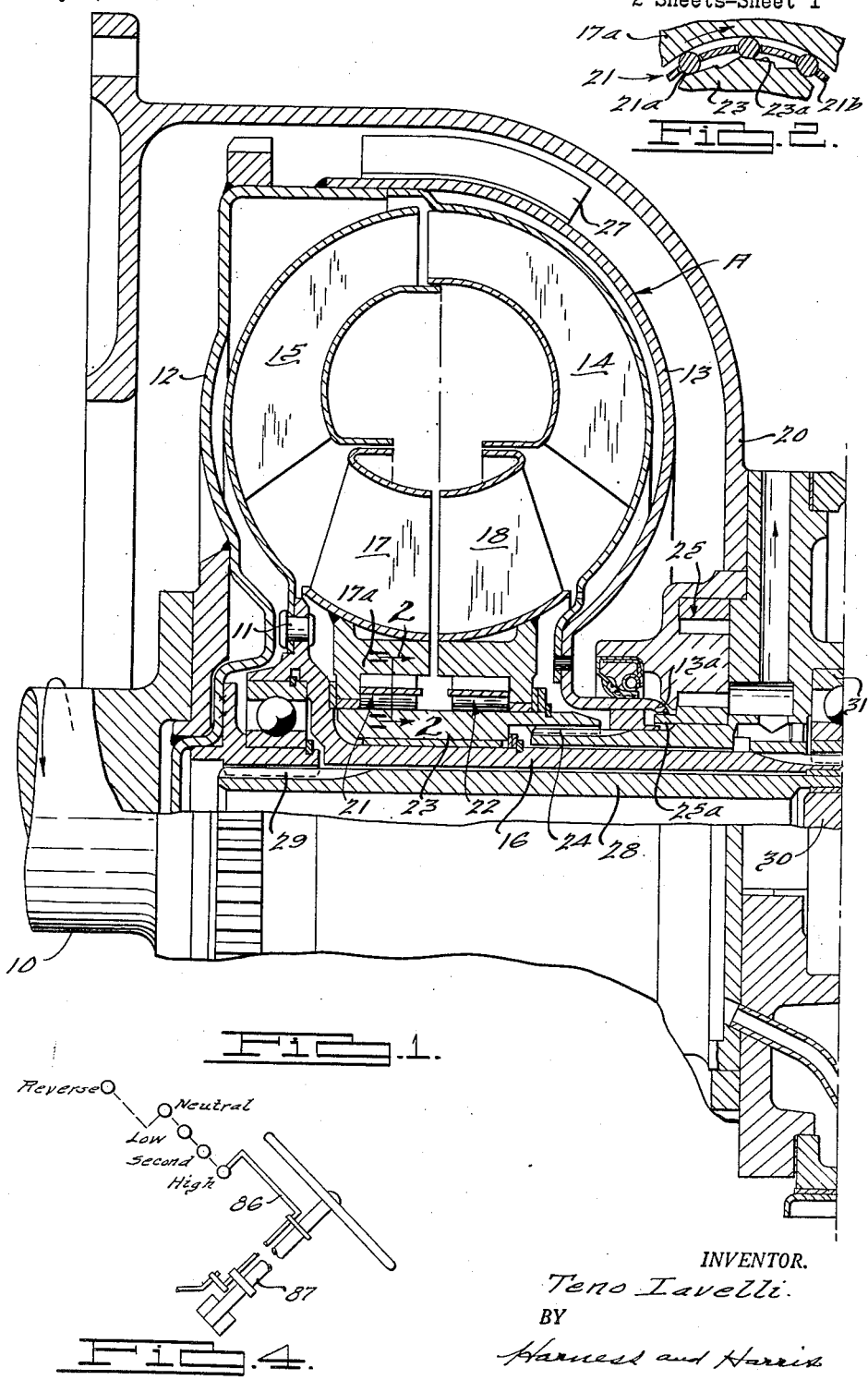
INVENTOR.
Teno Iavelli.
BY
Harness and Harris
ATTORNEYS.

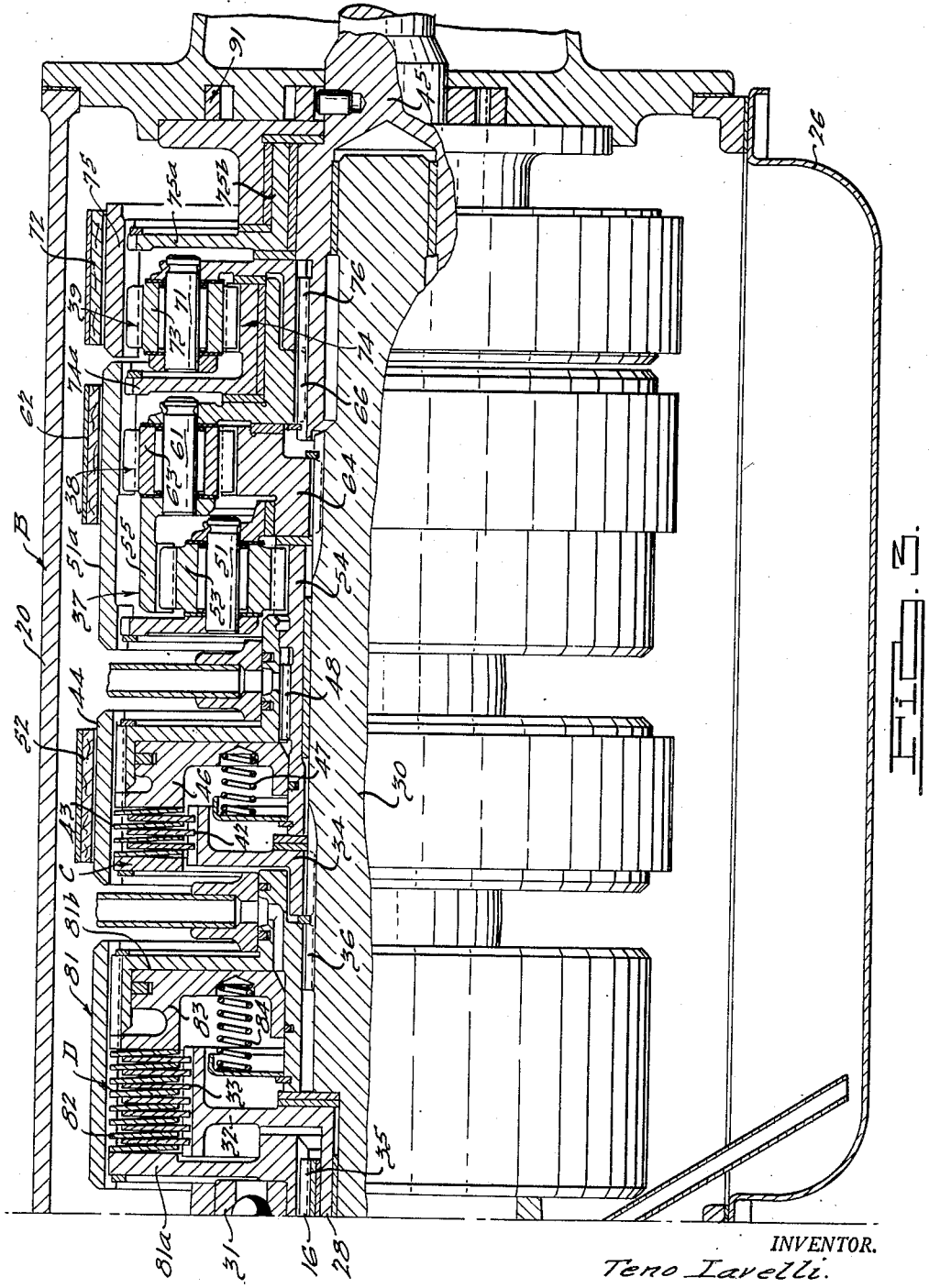

Patented May 8, 1951

2,551,746

UNITED STATES PATENT OFFICE 2,551,746

HYDRODYNAMIC TRANSMISSION

Teno Iavelli, Detroit, Mich., assignor to Chrysler Corporation, Highland Park, Mich., a corporation of Delaware Application May 8, 1948, Serial No. 25,873

4 Claims. (Cl. 74—732)

This invention relates to hydrodynamic transmissions and refers more particularly to improvements in variable speed ratio drives for motor vehicles. While particularly adapted for motor vehicle drive, still, this transmission may be incorporated in any machine where it would be desirable to provide means to automatically vary the speed ratio drive between the driving and driven elements as the torque demand and speed of the driven element varies.

More particularly my invention has to do with an improved and simplified power transmission comprising a hydraulic torque converter unit and associated mechanical gearing, so constructed and arranged as to provide means to automatically vary the speed ratio drive between the driving and the driven elements, the variations in speed ratio drive during normal drive occurring without the manual operation of a clutch pedal or any other manually operated control means.

It is a further object of this invention to provide a motor vehicle transmission comprising a hydraulic torque converter unit and an associated variable speed gear unit wherein means are provided to initiate acceleration of the vehicle through a combined fluid and mechanical, low speed, high torque multiplication, underdrive train, after which clutch means automatically effect a lock-out of the torque converter unit and continue the accelerating drive through a completely mechanical high speed underdrive train that is adapted to be subsequently upshifted into a positive direct drive as a result of the automatic operation of a second clutch means. The cruising direct drive train by-passes the torque converter unit so as to provide a slipless, efficient, direct drive that is particularly adapted for the utilization of engine braking.

It is a further object of this invention to provide a hydrodynamic transmission with a two-path power flow from the input to the output shaft, one path being adapted to take advantage of the torque multiplication and slip of the torque converter unit and the other path by-passing the torque converter unit to provide a positive, efficient ratio for transmitting direct drive.

It is a further object of this invention to provide a transmission comprising a planetary type, variable speed gear unit operatively associated with a hydraulic torque converter unit wherein manually activated means are available to effect a kickdown from direct drive to a completely mechanical high speed underdrive that is particularly adapted for accelerating drive in the cruising speed range. In addition to the manually operated means to effect the kickdown from direct drive, this transmission also includes means to effect automatic downshifts from direct drive to the high speed and low speed underdrives previously mentioned. The automatic shifts between the starting underdrive and the direct drive ratio are adapted to be controlled by some form of governor means responsive to the output shaft speed and the torque demand but other types of control means can be used to accomplish these automatic shifts. By virtue of the automatic shifts between the starting, low speed underdrive, the mechanical, high speed underdrive and the positive direct drive, there is provided a completely automatic transmission that readily accomplishes all variations in speed ratio drive required for normal vehicle operation.

It is a further object of this invention to provide a hydrodynamic transmission of the automatic type including a manually activated speed reduction gear train adapted for use as a coasting brake as well as an emergency low gear underdrive. This emergency underdrive is transmitted through the torque converter unit and a planetary gear train therefor the vehicle can be brought to a stop in this gear ratio without danger of stalling the driving engine. Furthermore the gear ratio of the planetary unit transmitting this drive is such that even though the converter unit may permit some slip when this drive is used as a coasting brake, still there is an adequate speed reduction to provide an efficient coasting brake.

It is a further object of this invention to supply a hydrodynamic transmission with means providing a combination fluid and mechanical, low speed, high torque multiplication underdrive for initial acceleration, which drive is adapted to be automatically upshifted into a positive, high speed, mechanical underdrive when the torque multiplying effect of the hydraulic unit begins to be less effective. By reasons of this shift into the positive underdrive, prior to the time the hydraulic torque converter unit begins to function as a fluid coupling, a more efficient power transmission unit is provided due to the converter unit being used only when the torque multiplying effect is most effective and most efficient. Furthermore, due to this two step upshift from the initial accelerating underdrive into the cruising direct drive, there is provided a transmission unit characterized by smooth, automatic changes in speed ratio drive.

It is a further object of this invention to provide a hydrodynamic transmission of simple design that includes a combination hydraulic and mechanical, high torque multiplication, starting underdrive for low speed acceleration, a positive, mechanical, high speed underdrive that continues the initial accelerating drive after the maximum effect of the hydraulic unit has been utilized, a positive direct drive for efficient cruising drive, a manually activated, completely mechanical, high speed, accelerating underdrive obtainable by a kickdown from direct drive, a low speed emergency underdrive adapted for use as a coasting brake, and a reverse drive.

It is a further object of this invention to provide a hydrodynamic transmission of a simplified form that provides four forward speeds and a reverse drive. This transmission is adapted for automatic operation under normal conditions and does not require a manually operated clutch pedal or the like.

Other objects and advantages of this invention will be apparent from a consideration of the attached specification and related drawings wherein:

Fig. 1 is a partial sectional elevational view showing the construction of the torque converter unit used with the planetary gear change speed unit of this transmission;

Fig. 2 is a fragmentary sectional elevational view taken along the line 2—2 of Fig. 1 disclosing the type of one-way or overrunning brake construction used between the torque converter guide wheels and the transmission housing;

Fig. 3 is a sectional elevational view of the planetary type, variable speed gear unit used in this transmission, the gearing being shown in the neutral condition; and Fig. 4 is a fragmentary view of a portion of the control means for the transmission.

The drawings disclose a hydrodynamic transmission which comprises a hydraulic torque converter unit A and a planetary type mechanical change speed unit B both mounted within a housing 20. The reference numeral 10 represents an end portion of a power driven shaft, such as the engine crankshaft of a motor vehicle, this shaft 10 being fixedly connected to the transmission flywheel assembly 12. The flywheel assembly 12 carries the torque converter casing 13 within which are mounted the converter components, namely, the impeller member 14, the turbine member 15, and the primary and secondary guide members or reaction wheels 17 and 18 respectively. The vaned impeller wheel 14 is fixedly connected to the converter casing 13 and is accordingly rotatably driven by the driving shaft 10. The vaned turbine wheel 15 is drivingly connected by rivet means 11 to the forward end portion of the hollow shaft member 16. The shaft member 16 has its rear end supported by the bearing assembly 31 at the forward end of the planetary gear unit B.

The vaned primary and secondary guide wheels 17 and 18 are connected to a forwardly projecting sleeve-like extension 23 of the transmission housing 20 through identical freewheeling or one-way brakes 21 and 22 respectively. As clearly shown in Fig. 2, the one-way brake construction 21 comprises rollers 21a mounted within a cage member 21b. The cage member 21b is normally urged into drive transmitting position by means of a tension spring (not shown). Cam surfaces 23a, formed on the peripheral surface of the housing sleeve member 23, cooperate with the rollers 21a and the hub portion 17a of guide wheel 17 to permit forward rotation only of the guide wheel 17. The sleeve member 23, forming the fixed portion of the one-way brake constructions 21 and 22, is splined to the transmission housing at 24. The one-way brake connections between the guide wheels 17 and 18 and transmission housing 20 permit the guide wheels to be rotated forwardly or clockwise (as viewed from the front of the transmission) by the impeller 14 but prevent rotation of the guide wheels in a reverse or counter-clockwise direction. The guide wheels 17 and 18 connected to the transmission housing 20 through the one-way brake connections 21 and 22 provide the reaction means for the converter unit. By using a plurality of guide wheels, connected to the transmission housing through separate one-way brakes, the efficiency and operating characteristics of the converter unit are improved as clearly explained in the United States patent to A. Coates, No. 1,760,480, dated May 27, 1930.

The transmission includes an engine driven, gear type oil pump 25 having a driving gear flange portion 25a which is directly connected to, and driven by projecting fingers 13a carried by the rotatable converter casing 13. The pump 25 draws oil from the sump in oil pan 26 and circulates it through the converter unit. This pump 25 also provides pressure fluid for lubricating purposes as well as for actuation of the various hydraulically operated control mechanisms associated with the transmission. The circulation of oil through the converter, by the engine driven pump 25, provides a means for maintaining the converter full of oil whenever the engine is running. Furthermore, this circulation of the working fluid through the converter and the lubricating and control systems provides a means for cooling the converter fluid. To further assist in the cooling of the converter fluid, fins 27 are provided on the exterior surface of the converter casing 13 to circulate air about the converter casing and thereby reduce the temperature of the fluid within the converter casing. While the engine driven pump 25 provides pressure fluid whenever the engine driven shaft 10 is rotated, still, to insure an adequate supply of pressure fluid at times when the engine may be dead, there is provided a second oil pump 91 which is drivingly connected to the transmission output or driven shaft 45 at the rear of the transmission. At low output shaft speeds, as when starting the vehicle engine by towing, the rear pump 91 provides sufficient pressure fluid to meet the requirements of the transmission. As the output shaft speed increases the front pump 25 automatically takes over the supply of pressure fluid and thereafter the rear pump 91 is by-passed.

A hollow shaft 28, concentrically mounted within the turbine-driven shaft 16, has its forward end drivingly connected to the power driven shaft 10 by means of the splined connection 29. The rear end of shaft 28 is supported within the bearing assembly 31. An annular member 32 is carried by the rear end portion of shaft 28, this annular member 32 supporting a plurality of friction clutch elements 33. Clutch elements 33 constitute a part of the torque converter lock-up clutch D.

The torque converter lock-up clutch D includes the drum member 81, whose radially extending supporting walls 81a and 81b are splined to the turbine-driven shaft 16 and the intermediate drive transmitting shaft 30, as shown respectively at 35 and 36. Drum member 81 carries friction clutch elements 82 which elements are adapted to be engaged with the clutch elements 33 carried by the power driven shaft 28. Obviously when these clutch elements 33 and 82 are engaged the power input train bypasses the torque converter and drive is transmitted directly from the drive shaft 10 to the intermediate drive transmitting shaft 30. A hydraulically actuated piston 83, slidably mounted within drum member 81, is adapted to be moved forwardly to effect engagement of the clutch elements 33 and 82. Compression springs 84 urge the reciprocable piston 83 rearwardly to a disengaged position.

The aforementioned intermediate drive transmitting shaft 30 has its forward end portion journaled within the bearing assembly 31 and its rear end portion is piloted in the forward end of the output shaft 45. Mounted on shaft 30 behind the torque converter lock-up clutch D and the subsequently described direct drive clutch C are three planetary gear trains indicated respectively by the numerals 37, 38 and 39. The forward gear train 37 and the intermediate gear train 38 cooperate with the torque converter unit A to provide means for obtaining a combination fluid and mechanical, high torque multiplication, low speed, accelerating, underdrive adapted for starting drive. These same components in combination with the torque converter lock-up clutch D provide means for transmitting a completely mechanical, high speed, underdrive adapted for acceleration and coast brake in the cruising speed range. Operating as an independent unit the intermediate gear train 38 provides a coasting gear ratio adapted for engine braking purposes and as an emergency low speed underdrive. The rear gear train 39 cooperates with the intermediate gear train 38 to provide a means for transmitting a reverse drive through the transmission. Direct drive is obtained by engaging the clutches C and D which lock up planetaries 37 and 38 and directly connect shaft 10 to output shaft 45 through the carrier member 61 of gear train 38.

The direct drive clutch C includes the annular member 34 which is splined to the intermediate shaft 30. Mounted on the peripheral portion of the member 34 are friction clutch elements 42. Clutch elements 42 are adapted to be engaged with cooperating clutch elements 43 carried by the drum-shaped member 44 which is splined to the forward planetary sun gear 54 as indicated at 48. Engagement of clutch elements 42 and 43 is affected through a hydraulically actuated piston member 46. Compression springs 47 normally urge piston 46 into a disengaged clutch position.

Forward planetary gear train 37 includes the planet pinion carrier 51 which is formed with an axially extending peripheral drum portion 51a adapted to be engaged by the braking band 62 of the intermediate gear train 38 as will be presently explained. Rotatably mounted on carrier 51 are a plurality of planet pinions 53, only one of which is herein shown. The teeth of pinions 53 drivingly mesh with the external teeth of the sun gear member 54. Sun gear member 54 is adapted to be anchored against rotational movement by the application of braking band 52 to the direct drive clutch drum 44 which is directly connected at 48 to sun gear 54 as already described. The teeth of pinions 53 are also in meshing engagement with the internal teeth on the drum-like extension 55 of the planet carrier 61 of the intermediate gear train 38. Member 55 thus constitutes the annulus gear of the forward planetary gear train 37. The drum member 55, while forming a part of the forward planetary gear train 37 is supported by and forms a part of the planet carrier 61 of the intermediate planetary gear train 38, thus a means is provided for transmitting a forward underdrive through the combined forward and intermediate planetary trains 37 and 38.

Intermediate planetary gear train 38 includes the planet pinion carrier 61 which is splined to and supported by the output shaft 45 as indicated at 66. Planet pinions 63, rotatably mounted on carrier 61, have teeth meshingly engaged with internal teeth on the rearwardly projecting drum portion 51a of planet carrier 51 of the forward planetary gear train 37. This internally toothed portion 51a of drum member 51 thus forms the annulus gear of the intermediate planetary gear train 38. The teeth of pinions 63 also engage external teeth on the sun gear 64 which is splined to the intermediate shaft 30. Braking band 62 is adapted to be applied to the drum member 51a to anchor the annulus gear of the intermediate gear train 38 against rotation.

Rear planetary gear train 39 includes the drum-like annulus member 75 which is rotatably supported by the radially extending wall portion 75a and axially extending hub portion 75b on the output shaft 45. Annulus member 75 is adapted to be anchored against rotation by the application of the braking band 72. Annulus member 75 carries internal teeth adapted to mesh with the teeth of the planet pinions 73. Planet pinions 73 are rotatably mounted on the pinion carrier 71 which is splined to the output shaft 45 as indicated at 76. The teeth of planet pinions 73 are also in meshing engagement with the sun gear 74. Sun gear 74 is connected by radially extending wall portion 74a to the annulus member 51a of the intermediate planetary gear train 38 which in turn is connected to the carrier 51 of the forward planetary gear train 37. Due to the aforedescribed connection between the several gear trains, drive from sun gear 64 of the intermediate train 38 may be transmitted through each of the three trains of the planetary unit B.

It will be noted that the input drive to any of the planetary gear trains 37, 38 and 39, whether considered singly or in a compounded relationship, is always through the driven sun gear member 64 which is splined to the intermediate drive transmitting shaft 30. Shaft 30 may be driven either by the torque converter driven shaft 16 or by the input driven shaft 28, depending on whether the lock-up clutch D is disengaged or engaged. Drive from sun gear 64 through the various planetary gear trains to the output shaft 45 is controlled by the selective application of the several braking bands for the several planetary gear trains.

During the operation of this transmission at no time is there more than one braking band applied. The control system for operation of the bands is so arranged that when any one band is applied the others are released and as one band is released another is applied, consequently the transition from one gear ratio to another is smooth and unnoticed.

Operation of the transmission is as follows:

With drive selector lever 86, which is normally mounted on the vehicle steering column 87, (see Fig. 4) positioned in Neutral, the transmission control system is so designed that the braking bands of the three planetary gear trains 37, 38 and 39 are all held in disengaged positions and the direct drive clutch C and torque converter lock-up clutch D are each maintained in a disengaged condition. Accordingly, drive can not be transmitted from the engine crankshaft 10 to the output shaft 45.

For ordinary forward drive the drive selector lever 86, is moved from the Neutral position to the position indicated as High. Movement of lever 86 to the High position causes suitable control means to lock brake band 52 about the drum member 44 to thereby anchor sun gear member 54 against rotation. Anchoring gear 54 against rotation activates the compounded gear trains 37 and 38 and conditions the transmission for the starting, low speed, forward underdrive. The control system for this transmission includes suitable means to maintain the clutches C and D disengaged during initial acceleration through the compounded gear trains 37 and 38. As a result of the activation of compounded gear train 37 and 38 by the application of brake band 52 to drum 44, and the disengaged condition of both clutch mechanisms C and D, the transmission is conditioned for the transmission of a combination hydraulic and mechanical, low speed, high torque multiplying, underdrive. Even with band 52 applied to anchor sun gear 54 so as to activate the compounded gear trains 37 and 38, still, at low input shaft speeds such as at closed throttle, there is sufficient slip in the torque converter unit to prevent forward drive of the output shaft 45.

Subsequently, as the speed of the input driving shaft 10 is increased to accelerate in the low speed, underdrive ratio, the speed of rotation of the converter impeller 14 is increased and a torque multiplying drive is transmitted through the torque converter unit A to the turbine-driven, hollow shaft member 16, drum member 81 and drive transmitting shaft 30 to the planetary sun gear member 64 of gear train 38. As sun gear 64 rotates, the planet pinions 63 of gear train 38 drive the annulus gear member 51a which is connected to and drives the carrier member 51 of gear train 37. Rotation of the carrier 51 drives planet pinions 53 about anchored sun gear 54 and this causes annulus gear 55 to be rotatably driven forwardly at an underdrive ratio. As annulus gear 55 is drivingly connected to the planet carrier member 61 of the planetary train 38 which is drivingly connected to the output shaft 45 through splines 66, a combination hydraulic and mechanical, high torque multiplying, low speed, forward underdrive, particularly adapted for initial vehicle acceleration, is transmitted from the engine crankshaft 10 through the torque converter unit A and certain of the planetary gearing B to the output shaft 45. It will be noted that this low speed, accelerating, underdrive is a combination fluid and mechanical torque multiplying drive for the torque multiplying effect of the converter unit is amplified by the mechanical advantage of the compounded planetary gear trains 37 and 38 and the product of this combination of drive transmitting mechanisms is transmitted to the output shaft 45 to provide the necessary accelerating power for the starting low speed underdrive.

On initial acceleration through the above-described low speed underdrive gear train, the converter impeller 14 is rotated in a clockwise (when viewed from the front of the transmission) direction by engine crankshaft 10. The shaping of the blades of the impeller, turbine and guide wheels of the converter unit is such that clockwise rotation of impeller 14 directs the converter fluid against the blades of the guide wheels 17 and 18 in such a manner as to tend to rotate the guide wheels in a reverse or counterclockwise direction. Due to the one-way brakes, 21 and 22, between the guide wheels and the sleeve extension 23 of the transmission housing 20, the guide wheels are locked-up against reverse rotation and a reaction effect is produced which multiplies the torque transmitted by the impeller member. This torque multiplication provides the high accelerating power necessary for the starting drive of a motor vehicle. During the major portion of this torque multiplication period the guide wheels 17 and 18 are locked-up by the one-way brakes 21 and 22 in a substantially stationary condition. As vehicle speed increases and the torque demand begins to decrease, the speeds of the converter impeller 14 and the runner 15 tend to attain substantially the same value. As the speeds of these members being to approach the same value, the reaction forces directed against the guide wheel blades gradually disappear and the impelled fluid within the converter begins to drive the guide wheels forwardly in a clockwise direction. The forward drive of the guide wheels is a step-by-step process as first one guide wheel will be picked up by the impelled converter fluid and rotated forwardly and subsequently the other guide wheel will be picked up by the converter fluid and rotated forwardly. The use of a plurality of converter guide wheels improves the efficiency and operating characteristics of the converter unit.

If the accelerating drive was continued through the above described starting underdrive train, eventually the impeller, turbine and guide wheels would all be rotating in the same direction at substantially the same speed and the torque converter unit A would be functioning as a simple fluid coupling. However, due to the fact that the torque multiplying effect of the converter unit decreases rapidly with increase in speed of the driven turbine member 15 and also due to the fact that the efficiency of the converter unit drops off as the turbine speed increases, suitable control means, such as a speed and torque responsive governor or the like, (not shown), automatically effects engagement of the torque converter lock-up clutch D, after the torque multiplying effect of the converter unit has been most advantageously utilized, but prior to the time the converter unit would begin to function as a simple fluid coupling, so that thereafter the accelerating underdrive is transmitted directly from the input shaft 10, via shaft 28 and clutch D to shaft 30, then to the input sun gear member 64 of the planetary gear train 38 and then through the compounded gear trains 38 and 37 to output shaft 45. With the converter unit locked out of the drive train by the engaged lock-up clutch D, the second step of the accelerating underdrive is then transmitted through a high speed, completely mechanical, underdrive train. Subsequently this latter underdrive is adapted to be automatically upshifted into direct drive, as will be presently described. The transmission may be maintained in the starting, low speed, underdrive gear by moving the drive selector lever 86, see Fig. 4, to the position indicated as Second if such a low speed mechanical underdrive is desired without a subsequent automatic upshift to direct drive. This mechanical underdrive ratio may also be manually selected to use the engine as a coast brake.

Normally when the output shaft speed in the starting, low speed, high torque multiplication, underdrive reaches a value equivalent to a vehicle speed of between 20 to 25 miles per hour, the torque multiplying effect, as well as the efficiency of the torque converter unit will have been reduced to a point where it is desirable to lock-up the torque converter unit A and continue the acceleration through the positive, high speed, underdrive. This automatic shift from the starting, low speed underdrive into the positive high speed underdrive is effected through some suitable control means, preferably one that is both speed and torque responsive. It is obvious that, by starting acceleration through the series connected torque converter unit and compounded underdrive gear trains so as to provide high torque multiplication and a smooth start, and then subsequently effecting an automatic lock-up of the torque converter unit, after the major benefit of the converter unit has been substantially utilized, there is provided a most efficient and satisfactory forward underdrive arrangement.

The acceleration at the higher output shaft speeds is continued through the completely mechanical, high speed, underdrive until such a point is reached that it is desirable to effect an automatic upshift into direct drive. Somewhere between approximately 25 and 60 miles per hour the output shaft speed and torque conditions will be such that the automatic upshift to direct drive will be advantageous. At this point suitable control means (not shown) automatically cause engagement of the direct drive clutch C and this locks up the sun gears of the compounded gear trains 37 and 38 and directly connects shaft 30 to the output shaft 45 through carrier member 61. The control system for this transmission is such that on upshift to direct drive from the high speed mechanical underdrive, the brake band 52 is released as the direct drive clutch C is applied. Simultaneous engagement of the direct drive clutch C and the release of the planetary brake band 52 converts the high speed, accelerating, underdrive into a positive direct drive from the crankshaft 10 to the output shaft 45. Direct drive is now transmitted by the drive train consisting of the crankshaft 10, hollow shaft 28, engaged clutch D, drum 81, shaft 30, engaged clutch C, locked-up gear trains 37 and 38, and carrier 61 to the output shaft 45. No manual control of any sort need be activated to accomplish the normal upshifts from starting underdrive to the direct drive.

If while operating in direct drive, the output shaft speed is substantially reduced and the torque demand increased, then the control means (not shown) that caused the automatic upshift to direct drive is automatically brought into operation and a downshift from direct drive to the high speed underdrive is effected. The control system will automatically disengage the direct drive clutch C and simultaneously apply the underdrive brake band 52 to the drum 44 of the planetary sun gear 54. As a result of this rearrangement of the planetary unit drive transmitting elements there is effected an automatic downshift from direct drive to the high speed, accelerating, underdrive. It will be noted that when operating in direct drive both clutches C and D are engaged and all braking bands are released.

While operating in the cruising direct drive ratio, the operator may desire to rapidly accelerate the output shaft driven machine. This may be accomplished by providing suitable manually activated control means to effect the downshift to the completely mechanical, high-speed, accelerating, underdrive. The manually activated downshift is accomplished by disengaging the direct drive clutch C and applying the underdrive brake band 52 as already described with regard to the automatic downshift. This downshift to the high speed, accelerating, underdrive is designed to be activated while the transmission is conditioned for direct drive and is specifically intended to be brought into operation prior to the time that a reduction in output shaft speed would cause an automatic downshift from direct drive to the high speed, accelerating, underdrive. This manually controlled kickdown from direct drive to the high speed accelerating underdrive is particularly advantageous for motor vehicle transmissions as it provides a high speed accelerating drive ratio particularly adapted for passing other motor vehicles while operating in the cruising speed range. Due to the kicked down drive train by-passing the torque converter unit the possibility of creating conditions where the driving engine would race or the converter unit slip during the kickdown are substantially eliminated. Conditions of this type might possibly result from a high speed kickdown through a fluid torque converter unit. The upshift from the manually activated, high speed, accelerating underdrive back to direct drive will be automatically effected by the controls previously mentioned. If while operating in the high speed underdrive the output shaft speed should drop and the torque demand increase, then the control system will automatically cause a disengagement of lock-up clutch D which will effect a shift into the low-speed, high torque multiplying, underdrive. A control system for a transmission of this type is shown in the application of Joseph Jandasek, Serial No. 11,712 filed February 27, 1948. As this application covers only this transmission per se a specific control system has not been disclosed.

To obtain reverse drive through this transmission the drive selector lever 86 is moved to the position indicated as Reverse and this causes the transmission control system to lock reverse band 72 about drum 75. Braking band 72 provides the reaction means for the reverse drive which is transmitted through the compounded gear trains 38 and 39. It is obvious that the braking bands 52 and 62 for the planetary gear trains 37 and 38 are in retracted, disengaged positions while the reverse band 72 is applied, as are both clutches C and D. Engagement of reverse band 72 and drum 75 locks the annulus gear of gear train 39 against rotation and drive can now be transmitted from the converter driven turbine member 15, through shaft member 16, drum 81 and shaft 30 to sun gear member 64 of gear train 38. Rotation of sun gear 64 rotatably drives the pinion gears 63 of planetary gear train 38 and this rotates annulus gear 51a due to anchored annulus gear 75 providing a reaction means for the compounded gear trains 38 and 39. Rotation of annulus gear 51a drives the sun gear member 74 of gear train 39 and this drives the pinion gears 73 about anchored annulus gear 75. This causes the pinions 73 and pinion carrier 71 to be reversely rotated. Carrier member 71 is directly connected to the output shaft 45 through splines 76. Accordingly, reverse drive will be transmitted to output shaft 45 through the compounded gear trains 38 and 39 when the reverse braking band 72 is locked about the annulus drum 75.

The intermediate planetary gear train 38 provides an emergency low speed underdrive as well as a coasting gear adapted for engine braking purposes. To obtain drive through this train it is merely necessary to move the drive control lever 86 to the position indicated as Low and this causes the transmission control system to lock brake band 62 about the drum portion 51a of the annulus gear member of the gear train 38. As the speed of drive shaft 10 is subsequently increased a low speed drive is transmitted from shaft 10, through the torque converter A to shaft 16, drum 81 and drive transmitting shaft 30 to the sun gear member 64 of gear train 38. Due to annulus gear of gear train 38 being anchored by band 62, the rotation of sun gear member 64 causes rotation of planet pinion gears 63 about the fixed annulus gear of gear train 38 and this drives the planet pinion carrier 61 forwardly at a reduced speed ratio. As planet pinion carrier member 61 is directly connected to the output shaft 45, through the splines 66, drive is now transmitted through the emergency low speed drive. It will be noted that when drive is being transmitted through this emergency low speed and coasting gear train 38 that the drive is through torque converter unit A. This permits a smooth start through this gear ratio and prevents engine stall in the event the output shaft is brought to a stop while the transmission is conditioned for the emergency low speed drive. At low drive shaft speeds the possibility of slip in this drive train is very slight and, furthermore, the gear ratio of this train is such that even though a slight amount of slip might develop, still, this drive train provides more than enough torque and speed reduction for it to efficiently operate as a coasting brake as well as an emergency low speed drive. Also, by going through the torque converter unit this drive takes advantage of the fluid connection to cushion the shifting into and out of this gear ratio.

It is obvious that this transmission can be modified by omitting the torque converter lock-up clutch D and still an operative, highly flexible, power transmission unit remains which unit will provide adequate variations in speed ratio drive to meet the requirements of the conventional motor vehicle. If the torque converter lock-up clutch D is omitted then there is a single step upshift from the low speed, high torque multiplication underdrive into the direct drive instead of the two step upshift provided by the transmission previously described. Instead of a four forward speeds and reverse transmission a three forward speeds and reverse transmission would be provided. In all other respects the two transmission units would function in the same manner.

I claim:

1. In a hydrodynamic transmission, a driving shaft and a driven shaft, a hydraulic torque converter unit comprising an impeller member and a turbine member, means drivingly connecting said driving shaft to said impeller member, a planetary gear unit, including a plurality of planetary gear trains, arranged in series relationship with said torque converter to provide mechanical and fluid means for securing torque multiplication of the drive passed through said transmission, said gear unit comprising a drive transmitting shaft, means drivingly connecting said turbine member and said drive transmitting shaft, a first low speed, forward, underdrive, planetary gear set mounted on said drive transmitting shaft comprising a first sun gear drivingly connected to said drive transmitting shaft, a first set of planetary pinion gears meshingly engaged with said first sun gear, a first annulus gear meshingly engaged with said first set of planetary pinion gears, a carrier for said first set of planetary pinion gears drivingly connected to said driven shaft, a first braking means to anchor said first annulus gear against rotation so that said first low speed gear set may be activated to mechanically multiply the torque of the drive transmitted by said turbine member, a second, intermediate speed, forward, underdrive, planetary gear set mounted on said drive transmitting shaft and arranged to be compounded with said first planetary gear set comprising a second sun gear journaled on said drive transmitting shaft, a second set of planetary pinion gears meshingly engaged with said second sun gear, a second annulus gear meshingly engaged with said second set of planetary pinion gears and drivingly connected to said first planetary pinion gear carrier of the first planetary gear set, a carrier for the second set of planetary pinion gears drivingly connected to said first annulus gear of the first planetary gear set, a second braking means to anchor said second sun gear against rotation so that the said first and second planetary gear sets may be activated to cooperatively multiply the torque of the drive transmitted by said turbine driven member, a direct drive clutch mounted on said drive transmitting shaft comprising means to drivingly engage said first and said second sun gears to lock-up said first and said second planetary gear sets and provide means for the direct drive transmission of the torque transmitted to said drive transmitting shaft, and a torque converter lock-up clutch comprising means to drivingly engage said driving shaft and said turbine member to provide means for by-passing said converter.

2. In a hydrodynamic transmission, a driving shaft and a driven shaft, a hydraulic torque converter unit comprising an impeller member and a turbine member, means drivingly connecting said driving shaft to said impeller member, a planetary gear unit, including a plurality of planetary gear trains, arranged in series relationship with said torque converter to provide mechanical and fluid means for securing torque multiplication of the drive passed through said transmission, said gear unit comprising a drive transmitting shaft, means drivingly connecting said turbine member and said drive transmitting shaft, a first low speed, forward, underdrive, planetary gear set mounted on said drive transmitting shaft comprising a first sun gear drivingly connected to said drive transmitting shaft, a first set of planetary pinion gears meshingly engaged with said first sun gear, a first annulus gear meshingly engaged with said first set of planetary pinion gears, a carrier for said first set of planetary pinion gears drivingly connected to said driven shaft, a first braking means to anchor said first annulus gear against rotation so that said first low speed gear set may be activated to mechanically multiply the torque of the drive transmitted by said turbine member, a second, intermediate speed, forward, underdrive, planetary gear set mounted on said drive transmitting shaft and arranged to be compounded with said first planetary gear set comprising a second sun gear journaled on said drive transmitting shaft, a second set of planetary pinion gears meshingly engaged with said second sun gear, a second annulus gear meshingly engaged with said second set of planetary pinion gears and drivingly connected to said first planetary pinion gear carrier of the first planetary gear set, a carrier for the second set of planetary pinion gears drivingly connected to said first annulus gear of the first planetary gear set, a second braking means to anchor said second sun gear against rotation so that the said first and second planetary gear sets may be activated to cooperatively multiply the torque of the drive transmitted by said turbine driven member, a third, reverse drive, planetary gear set mounted on said drive transmitting shaft and arranged to be compounded with said first planetary gear set comprising a third sun gear drivingly connected to said first annulus gear of the first planetary gear set, a third set of planetary pinion gears meshingly engaging the said third sun gear, a third annulus gear meshingly engaged with said third set of planetary pinion gears, a third braking means to anchor said third annulus gear against rotation so that said third planetary gear set may be activated for the transmission of a reverse drive from said turbine member to said driven shaft, a direct drive clutch mounted on said drive transmitting shaft comprising means to drivingly engage said first and said second sun gears to lock-up said first and said second planetary gears sets and provide means for the direct drive transmission of the torque transmitted to said drive transmitting shaft, and a torque converter lock-up clutch comprising means to drivingly engage said driving shaft and said turbine member to provide means for by-passing said converter.

3. In a hydrodynamic transmission, coaxially arranged input and output shafts, a hydraulic torque converter unit including rotatable impeller and turbine members, means drivingly connecting the input shaft and the impeller member, a planetary gear unit connected between the turbine member and the output shaft to provide mechanical means for securing torque multiplication of the drive transmitted by said turbine member, said gear unit comprising a drive transmitting shaft coaxial with and extending between the input and output shafts, means drivingly connecting the turbine member and the drive transmitting shaft, a first, forward, underdrive, planetary gear set mounted on and adapted to be directly driven by said drive transmitting shaft, means adapted to drivingly connect said first planetary gear set to said output shaft upon activation of said first planetary gear set, a first braking means engageable with said first gear set to activate said first planetary gear set whereby a first combination fluid and mechanical torque multiplying forward underdrive ratio is transmitted between said input and said output shafts, a second, forward, underdrive planetary gear set mounted on said drive transmitting shaft having portions thereof drivingly connected to portions of said first planetary gear set to provide means for compounding said first and second planetary gear sets and having other portions thereof adapted to be drivingly connected to said output shaft upon activation of the second planetary gear set, a second braking means engageable with said second gear set to activate said second planetary gear set whereby a second combination fluid and mechanical torque multiplying forward underdrive ratio is transmitted to said output shaft from said input shaft, a torque converter clutch engageable to directly connect the converter impeller and turbine elements whereby said second combination fluid and mechanical torque multiplying underdrive is convertible to a positive, two-way, mechanically transmitted forward underdrive and a direct drive clutch engageable to drivingly connect portions of the first and second planetary gear sets to directly connect the drive transmitting shaft to the output shaft and provide means for obtaining a positive, two-way, direct drive between said input and output shafts when said torque converter clutch is simultaneously engaged and said first and second planetary braking means are released, said direct drive clutch being operable upon disengagement to effect a downshift from said direct drive to a positive, two-way, forward, underdrive when said torque converter clutch is engaged, said second planetary braking means engaged and said first planetary braking means released.

4. In a hydrodynamic transmission, coaxially arranged input and output shafts, a hydraulic torque converter unit including rotatable impeller and turbine members, means drivingly connecting the input shaft and the impeller member, a planetary gear unit connected between the turbine member and the output shaft to provide mechanical means for securing torque multiplication of the drive transmitted by said turbine member, said gear unit comprising a drive transmitting shaft coaxial with and extending between the input and output shafts, means drivingly connecting the turbine member and the drive transmitting shaft, a first, forward, underdrive, planetary gear set mounted on and adapted to be directly driven by said drive transmitting shaft, means adapted to drivingly connect said first planetary gear set to said output shaft upon activation of said first planetary gear set, a first braking means engageable with said first gear set to activate said first planetary gear set whereby a first combination fluid and mechanical torque multiplying forward underdrive ratio is transmitted between said input and said output shafts, a second, forward, underdrive planetary gear set mounted on said drive transmitting shaft having portions thereof drivingly connected to portions of said first planetary gear set to provide means for compounding said first and second planetary gear sets and having other portions thereof adapted to be drivingly connected to said output shaft upon activation of the second planetary gear set, a second braking means engageable with said second gear set to activate said second planetary gear set whereby a second combination fluid and mechanical torque multiplying forward underdrive ratio is transmitted to said output shaft from said input shaft, a torque converter clutch engageable to directly connect the converter impeller and turbine elements whereby said second combination fluid and mechanical torque multiplying underdrive is convertible to a positive, two-way, mechanically transmitted forward underdrive and a direct drive clutch engageable to drivingly connect portions of the first and second planetary gear sets to directly connect the drive transmitting shaft to the output shaft and provide means for obtaining a positive, two-way, direct drive between said input and output shafts when said torque converter clutch is simultaneously engaged and said first and second planetary braking means are released, said direct drive clutch being operable upon disengagement to effect a downshift from said direct drive to a positive, two-way, forward, underdrive when said torque converter clutch is engaged, said second planetary braking means engaged and said first planetary braking means released, and a third, reverse drive, planetary gear set mounted on said drive transmitting shaft and arranged to be compounded with said first gear set having portions thereof drivingly connected to said first planetary gear set and to said output shaft to provide means whereby a combination fluid and mechanical torque multiplied reverse drive may be transmitted to said output shaft from said input shaft upon activation of said third planetary gear set, and a third braking means engageable with said third gear set to activate said third planetary gear sets for the transmission of the said reverse drive.

TENO IAVELLI.

REFERENCES CITED

The following references are of record in the file of this patent:

UNITED STATES PATENTS

| Number | Name | Date |
|---|---|---|
| 2,127,655 | Stromquist et al. | Aug. 23, 1938 |
| 2,332,593 | Nutt et al. | Oct. 26, 1943 |